United States Patent
Hsiao et al.

(10) Patent No.: US 7,990,810 B2
(45) Date of Patent: Aug. 2, 2011

(54) DATA READING MODULE AND METHOD FOR READING OPTICAL DISC

(75) Inventors: Jung-Lee Hsiao, Hsinchu County (TW); Cheng-Chieh Lin, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 775 days.

(21) Appl. No.: 12/105,264

(22) Filed: Apr. 18, 2008

(65) Prior Publication Data

US 2009/0262450 A1 Oct. 22, 2009

(51) Int. Cl.
*G11B 7/085* (2006.01)
(52) U.S. Cl. ...................... 369/30.03; 360/75
(58) Field of Classification Search .............. 369/30.03, 369/30.04, 30.01; 360/75; 386/95, 248, 386/290, 125, 355
See application file for complete search history.

(56) References Cited

U.S. PATENT DOCUMENTS 7,945,143 B2 * 5/2011 Yahata et al. ................. 386/326
2011/0033172 A1 * 2/2011 Ando et al. .................... 386/355

* cited by examiner

*Primary Examiner* — Ali Neyzari
(74) *Attorney, Agent, or Firm* — Winston Hsu; Scott Margo

(57) ABSTRACT

Disclosed is a data reading module for reading an optical disc with data regions and undesired regions, wherein at least one of the undesired regions is located between the data regions. The data reading module includes: a decoder arranged to decode the optical disc to generate decoded data; a data transferring device arranged to transfer the decoded data; and a controller arranged to control the decoder according to a recorded map indicating the locations of the data regions and the undesired regions; wherein the controller controls the decoder to skip the undesired regions and does not decode the undesired regions while decoding the optical disc.

17 Claims, 3 Drawing Sheets

DATA READING MODULE AND METHOD FOR READING OPTICAL DISC

BACKGROUND

The present invention relates to a data reading module, and particularly relates to a data reading module for reading an optical disc.

Data written to an optical disc of fragment recording type (for example, a DVD) can be randomly written; therefore the data regions on the optical disc of fragment recording type are not continuous. The empty regions and the data regions are interlaced. Normally, a recorded map indicating the address of the data regions and empty regions is stored on the optical disc (for HD DVD, it is a bit-map; for Blu-ray disc, it is a space bitmap), and the data reading module (for example, an optical disc driver) reads the optical disc according to the recorded map.

FIG. 1 is a flow chart illustrating the steps of a related art data reading method. As shown in FIG. 1, the method obtains blank blocks with address X and continuous blank blocks Y, and stops the reading head (such as an optical pickup head) at X. Then, Y blank blocks are prepared and the optical pickup head is moved to X+Y for re-starting data reading. Such operation is normally named a "Seek operation".

However, such an operation needs to stop the reading head each time when an empty region is encountered and then re-start reading again. The performance of the data reading module will gradually degrade.

SUMMARY OF THE INVENTION

Therefore, one objective of the present invention is to provide a data reading module, which does not stop the reading head while reading an optical disc of a fragment-recording type, such that the performance of the data reading module is improved over the prior art.

One embodiment of the present invention discloses a data reading module for reading an optical disc with data regions and undesired regions, wherein at least one of the undesired regions is located between the data regions. The data reading module comprises: a storage device, for buffering data from the optical disc; a decoder, coupled to the storage device, for decoding the optical disc to generate decoded data; a data transferring device, coupled to the storage device, for transferring the decoded data; and a controller, coupled to the decoder, for controlling the decoder according to a recorded map indicating the locations of the data regions and the undesired regions; wherein the controller controls the decoder to skip the undesired regions and does not decode the undesired regions while decoding the optical disc.

Another embodiment of the present invention discloses a data reading method for reading an optical disc with data regions and undesired regions, wherein at least one of the undesired regions is located between the data regions. The method comprises: (a) obtaining the locations of data regions and undesired regions from a recorded map; (b) skipping the undesired regions while decoding the optical disc; and (c) transferring decoded data from the optical disc.

According to the above-mentioned module and method, repeating of the seeking operation can be avoided, and therefore the performance of the data reading module can be improved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
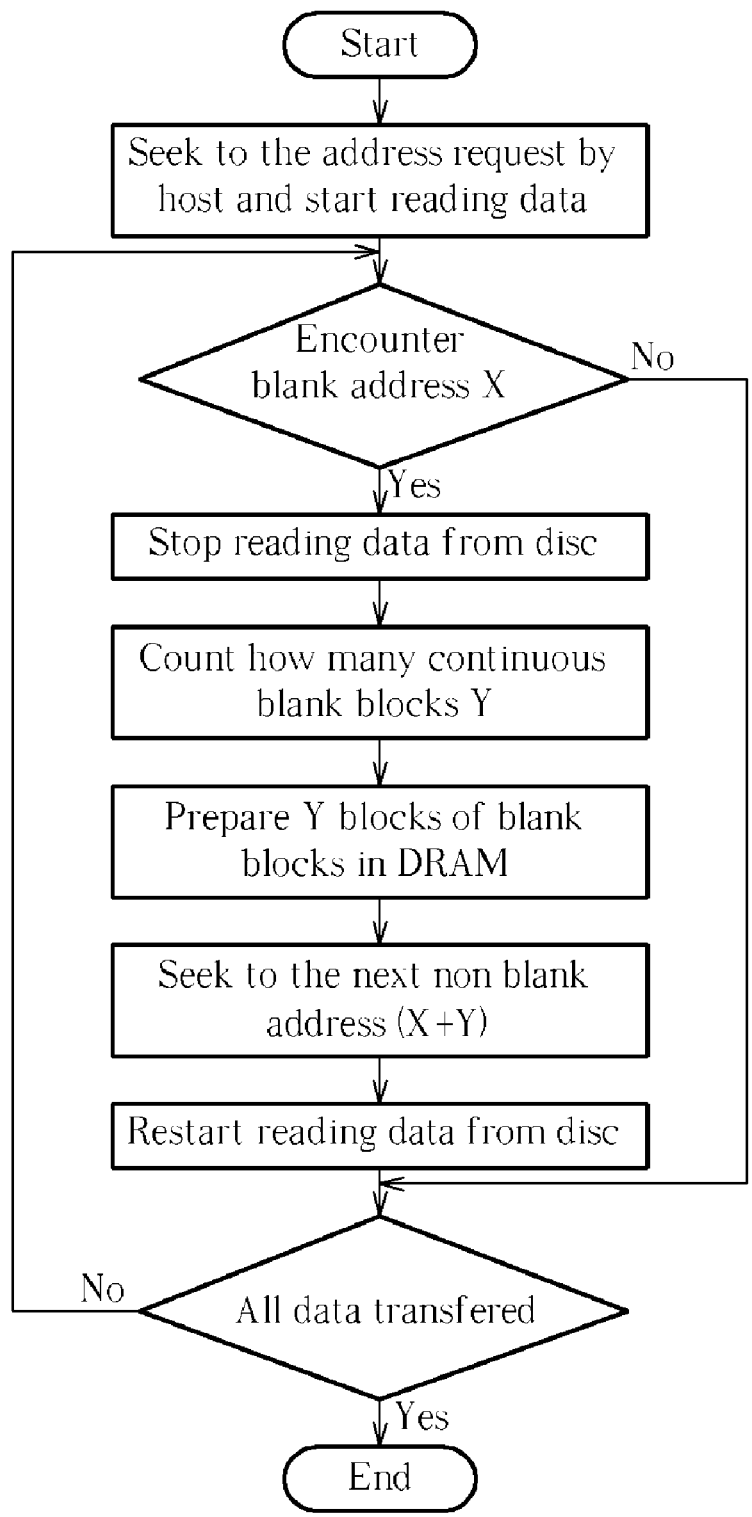
FIG. 1 is a flow chart illustrating the steps of a data reading method of related art.
Figure 2:
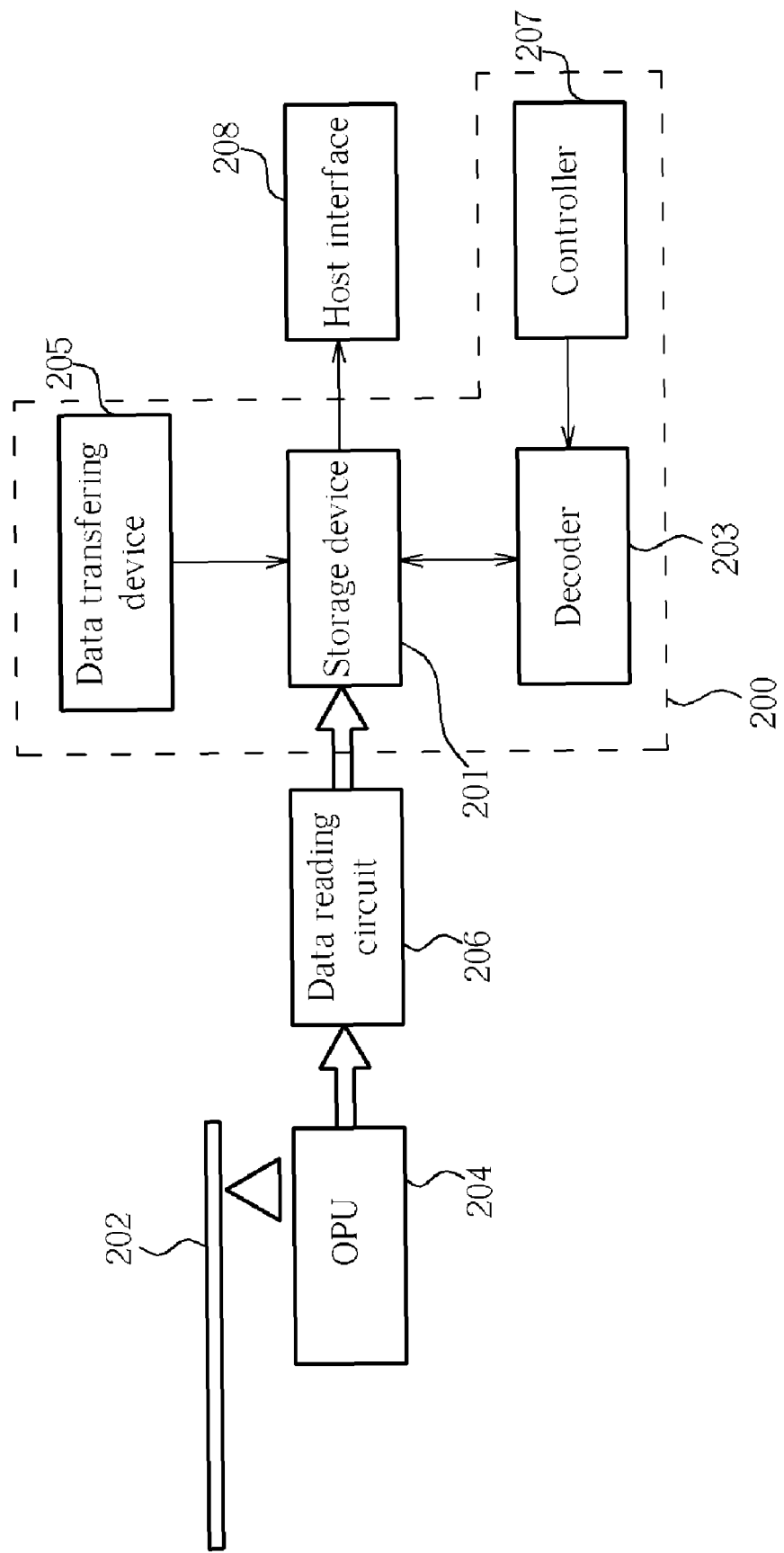
FIG. 2 is a block diagram illustrating a data reading module according to an embodiment of the present invention.

FIG. 2 is a block diagram illustrating a data reading module 200 according to an embodiment of the present invention. In this embodiment, the data received by the data reading module 200 is from an optical disc 202 via an optical pickup head 204 and a data reading circuit 206, and the data is outputted from the data reading module 200 to a host interface 208. The optical disc 202 is a fragment-recording type, that is, the optical disc 202 includes data regions (with data) and empty regions (without data) interlaced together.

As shown in FIG. 2, the data reading module 200 comprises: a storage device 201, a decoder 203, a data transferring device 205, and a controller 207. The storage device 201 is used for buffering data from the optical disc 202. The decoder 203, which is coupled to the storage device 201, is used for decoding the optical disc 202 to generate decoded data. The data transferring device 205, which is coupled to the storage device 201, is used for transferring the decoded data stored in the storage device 201 to the host interface 208. The controller 207, which is coupled to the decoder 203, is used for controlling the decoder 203 according to a recorded map indicating the locations of the data regions and the empty regions. The controller 205 controls the decoder 203 to skip the empty regions and does not decode the empty regions while decoding the optical disc 202.

It is noted that some embodiments don't have the storage device 201, and other devices (such as the decoder 203, the data transferring device 205, and the host interface 208) receive the data from the data reading circuit 206. Therefore, the storage device 201 can be omitted when other devices are efficient enough.

The operation of the data reading module 200 can be summarized as follows: after the data is read from the optical disc 202 via the OPU 204 and the data reading circuit 206, the data is stored to the storage device 201. Then the decoder 203 starts to decode the buffered data. The controller 207 controls the decoder 203 to skip the empty regions and does not decode the empty regions according to a recorded map while decoding the optical disc 202.

It is noted that the recorded map could be a space bitmap in Blu-ray disc, wherein the space bitmap contains one bit per cluster in logical address order. When a bit is set to zero, the associated cluster hasn't been written. When the bit is set to one, the associated cluster has been written.

Thereafter, since the host needs to receive some object from the empty regions while receiving data, the data transferring device 205 replaces the empty regions with substitute data while transferring the decoded data. Please note that this is not meant to limit the scope of the present invention. Such an operation can be omitted according to the requirement of the host. Also, the empty regions may have some undesired information recorded thereon and may not be totally empty, thus the non-empty regions can be regarded as un-desired regions. That is, the data reading module 200 according to the present invention not only can be applied to an optical disc having interlaced data regions and empty regions, but also can be applied to an optical disc having interlaced data regions and un-desired regions. Also, in this embodiment, the substitute data is blank data, and the recorded map is read from the optical disc, but this is not meant to limit the scope of the present invention. The substitute data can be other data besides blank data, and the recorded map can be read from another source besides the optical disc.

In this embodiment, the controller 207 further utilizes at least one flag to indicate the locations of the empty regions, and the data transferring device replaces the undesired regions with the substitute data according to the flag. Please note this is only an example, and persons skilled in the art can utilize other marks to mark the empty regions.

If the optical disc is a HD DVD or Blu-ray disc, the recorded map is respectively a bit map or a space bitmap for recording the locations of the data regions and the empty regions via an ECC pair. However, the recorded map can also be an array indicating the locations of the data regions and the empty regions.

More particularly, the data reading circuit 206 is arranged to receive signal from the optical pickup head 204, and transfer the received signal to be data for the following processes.

Figure 3:
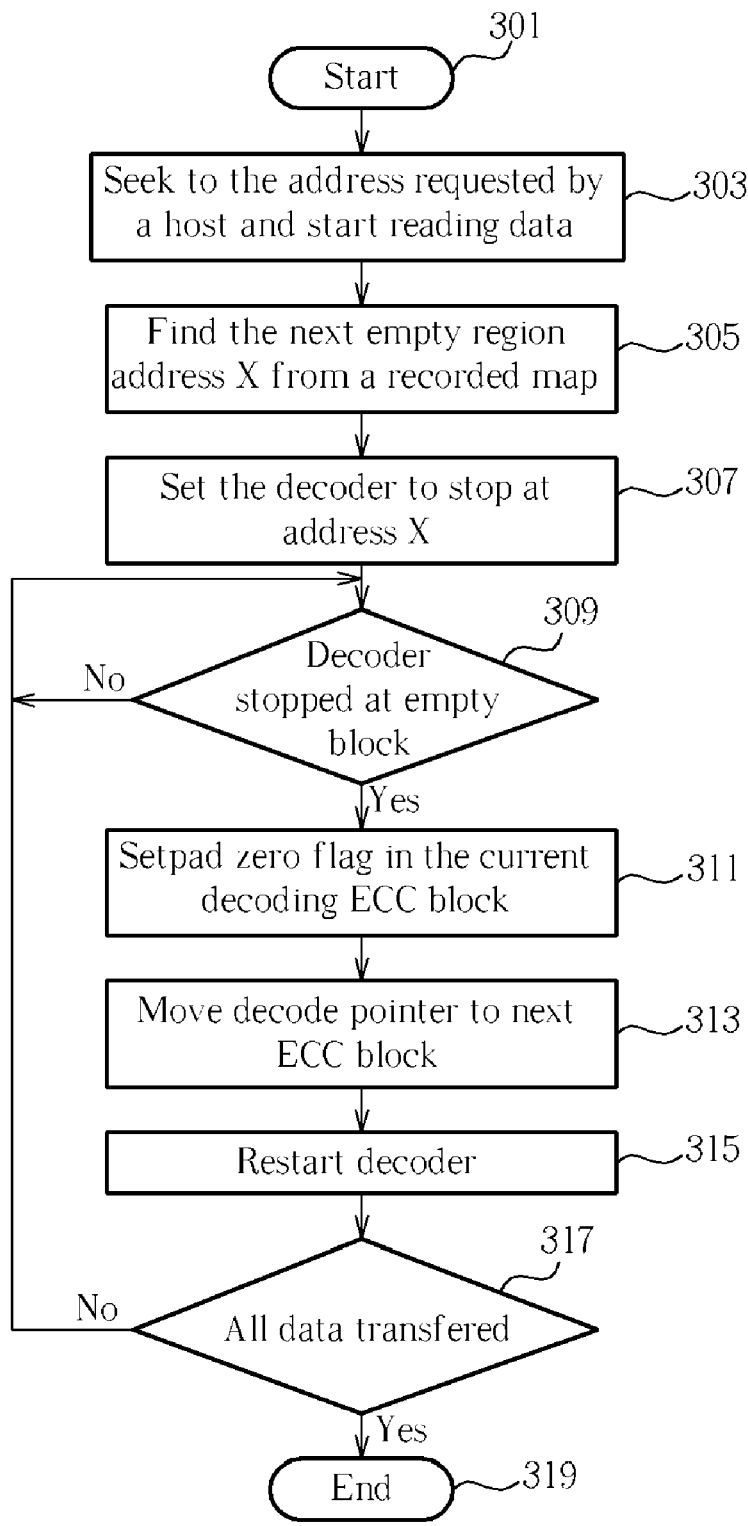
FIG. 3 is a flow chart illustrating a data reading method according to an embodiment of the present invention.

FIG. 3 is a flow chart illustrating a data reading method according to an embodiment of the present invention. It should be noted that the embodiment is only utilized as an example and is not meant to limit the scope of the present invention. The data reading method comprises:

Step 301: Start
Step 303: Seek to the address requested by a host and start reading data
Step 305: Find the next empty region address X from a recorded map
Step 307: Stop the decoder at address X
Step 309: Determine whether the decoder stops at the empty region. If yes, go to step 311; if no, go back to step 309.
Step 311: Set flag in the current decoding data (or ECC block)
Step 313: Move decode pointer to next data (or next ECC block)
Step 315: Restart the decoder
Step 317: Check whether all the data is transferred. If yes, end the process; if no, go back to step 309.

The above-mentioned data reading method can be summarized as follows: obtaining the locations of data regions and empty regions from a recorded map; skipping the empty regions while decoding the optical disc; and transferring decoded data from the optical disc. This method can further comprise replacing the empty regions with substitute data while transferring the decoded data. Other detailed techniques are disclosed above, and thus are omitted here for brevity.

According to the above-mentioned module and method, only the decoder is stopped and no reading head is stopped. In this way, the repeating seeking operation can be avoided, and the performance of the data reading module can increase. Those skilled in the art will readily observe that numerous modifications and alterations of the device and method may be made while retaining the teachings of the invention.

What is claimed is:

1. A data reading module for reading an optical disc with data regions and undesired regions, wherein the data regions and the undesired regions are interlaced, the data reading module comprising:
   a decoder arranged to decode data to generate decoded data;
   a data transferring device arranged to transfer the decoded data and
   a controller arranged to control the decoder according to a recorded map indicating the locations of the data regions and the undesired regions;
   wherein the controller controls the decoder to skip the undesired regions and does not decode the undesired regions according to the recorded map.

2. The data reading module of claim 1, wherein data transferring device replaces the undesired regions with substitute data while transferring the decoded data.

3. The data reading module of claim 1, wherein the substitute data is blank data.

4. The data reading module of claim 1, wherein the controller further utilizes at least one mark to indicate the locations of the undesired regions, and the data transferring device replaces the undesired regions with the substitute data according to the mark.

5. The data reading module of claim 1, wherein the optical disc is a HD DVD disc.

6. The data reading module of claim 1, wherein the optical disc is a Blu-ray disc.

7. The data reading module of claim 1, wherein the recorded map is an array indicating the locations of the undesired regions.

8. The data reading module of claim 1, wherein the recorded map is read from the optical disc.

9. The data reading module of claim 1, further comprising a storage device arranged to buffer the data from the optical disc, and the decoder decodes the data buffered in the storage device to generate the decoded data.

10. A data reading method for reading an optical disc with data regions and undesired regions, wherein the data regions and the undesired regions are interlaced, the data reading method comprising:
    (a) obtaining the locations of data regions and undesired regions from a recorded map;
    (b) skipping the undesired regions while decoding the optical disc; and
    (c) transferring decoded data from the optical disc.

11. The data reading method of claim 10, the step (c) further comprising: replacing the undesired regions with substitute data while transferring the decoded data.

12. The data reading method of claim 11, wherein the substitute data information is blank data.

13. The data reading method of claim 10, wherein the step (b) further utilizes at least one mark to indicate the locations of the undesired regions, and the step (c) replaces the undesired regions with the substitute data information according to the mark.

14. The data reading method of claim 10, wherein the optical disc is a HD DVD disc.

15. The data reading method of claim 10, wherein the optical disc is a Blu-ray disc.

16. The data reading method of claim 10, wherein the recorded map is an array indicating the locations of the undesired regions.

17. The data reading method of claim 10, wherein the recorded map is read from the optical disc.

* * * * *